Figure 1:
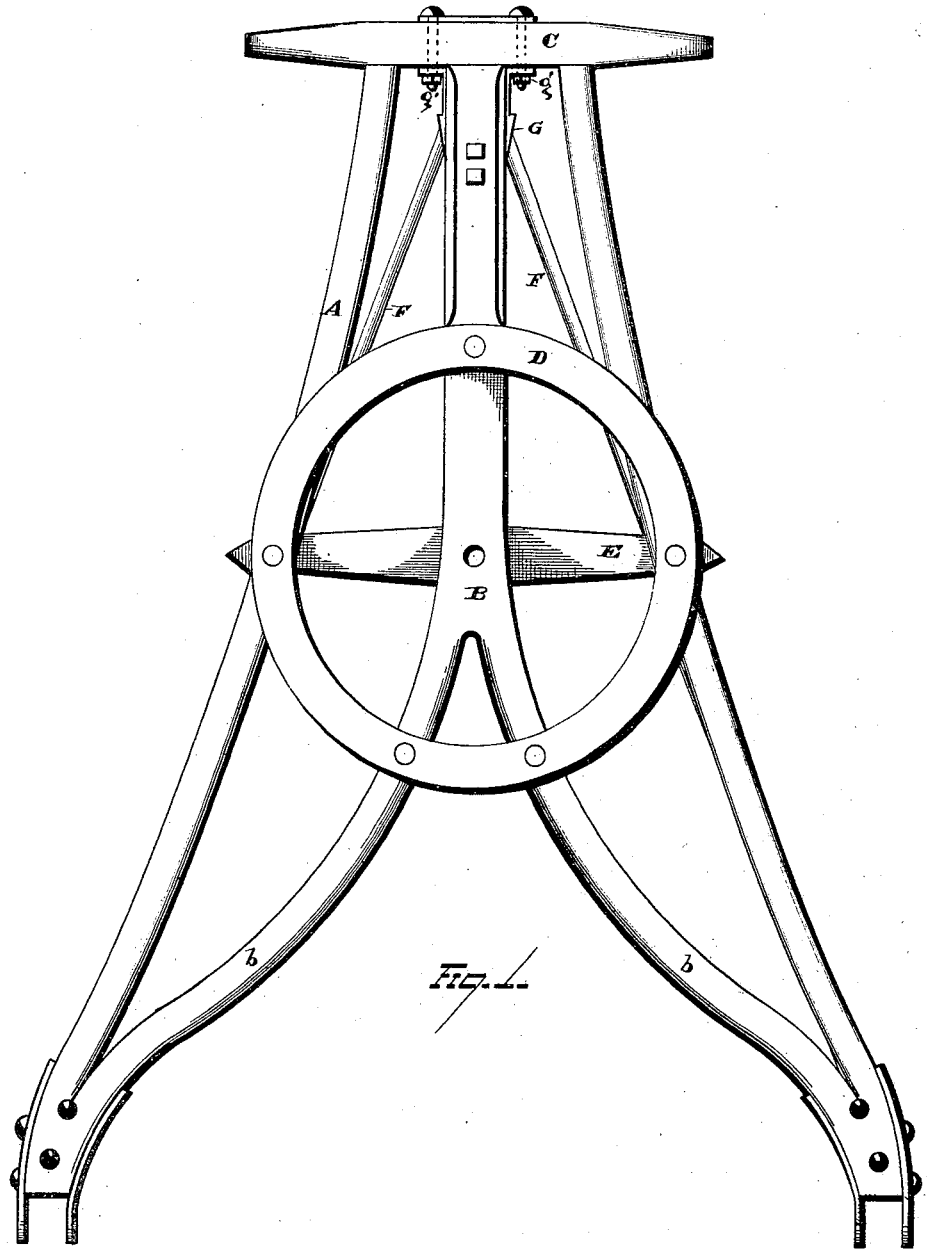

(No Model.) 2 Sheets—Sheet 1.

C. R. WILSON.
Platform Gear for Vehicles.

No. 234,700. Patented Nov. 23, 1880.

WITNESSES
E. J. Nottingham
A. W. Bright

INVENTOR
Chas R. Wilson
By Urell W. Leggett
ATTORNEY

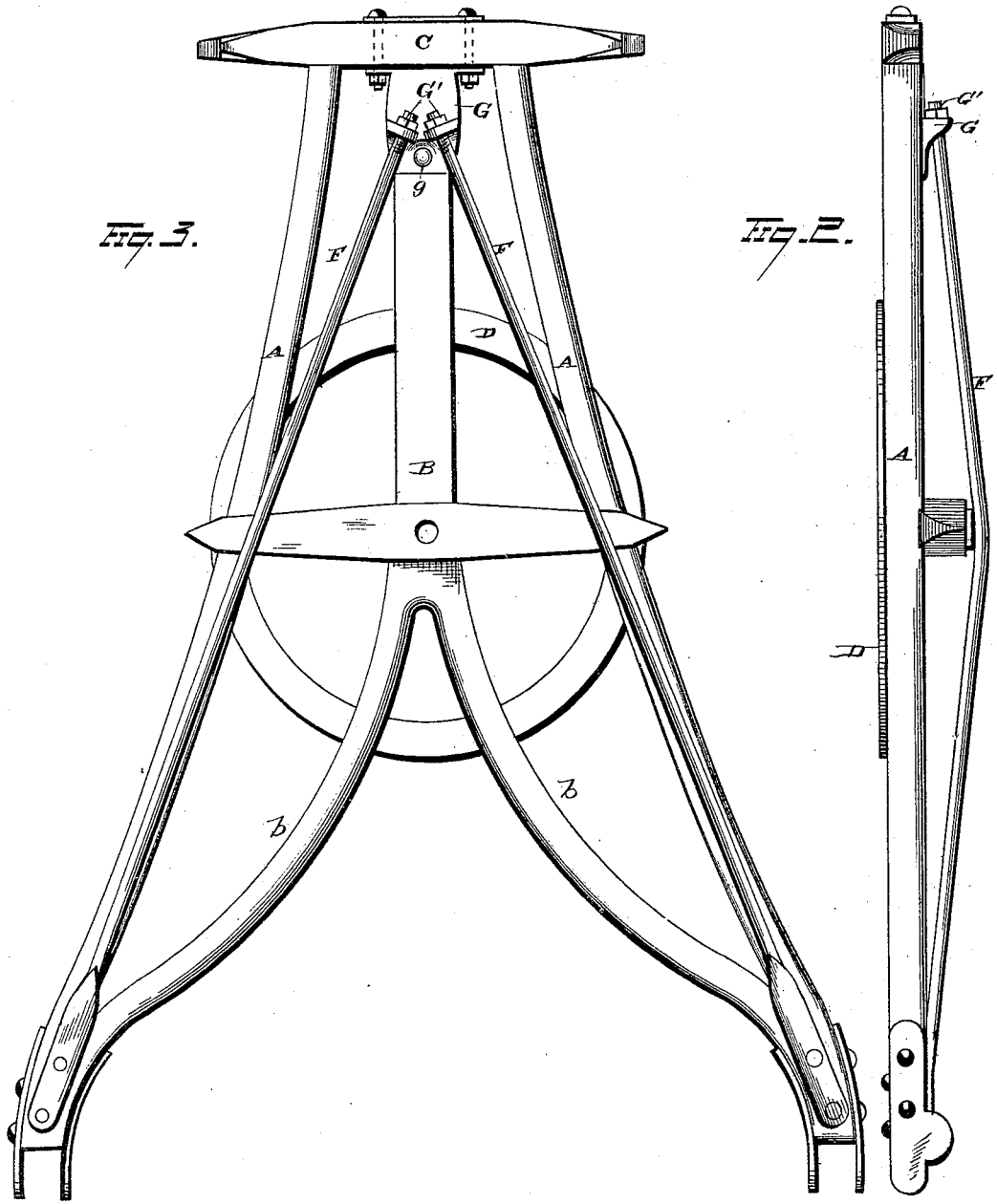

UNITED STATES PATENT OFFICE.

CHARLES R. WILSON, OF DETROIT, MICHIGAN.

PLATFORM-GEAR FOR VEHICLES.

SPECIFICATION forming part of Letters Patent No. 234,700, dated November 23, 1880.

Application filed April 17, 1880. (No model.)

*To all whom it may concern:*

Be it known that I, CHARLES R. WILSON, of Detroit, county of Wayne, State of Michigan, have invented a new and useful Improvement in Platform-Gears; and I do hereby declare the following to be a full, clear, and exact description of the same, such as will enable others skilled in the art to which it pertains to make and use it, reference being had to the accompanying drawings, which form a part of this specification.

My invention relates to platform-gears for platform spring-wagons.

My invention consists of the combinations of devices and appliances hereinafter set forth, and more particularly pointed out in the claim.

In the drawings, Figure 1 is a top view, Fig. 2 a side view, and Fig. 3 a bottom view, of a platform-gear embodying my improvements.

A represents the side pieces, and B the center piece, of a platform-gear. C is the end piece; D, the circle-bar; E, a sand-board, (of which there may be one or more, if desired,) located beneath the side and center pieces.

F represents truss-rods springing from the divergent ends of the side pieces, passing thence beneath the sand-board and through a brace-block, G, where they are terminated with nuts G', by which the truss-rods may be tightened up when necessary.

The brace-block is, by suitable bolts, $g$, attached to the center bar, and is also connected, by bolts and nuts $g'$, with the end piece, C.

I form the frame-work as follows: The center piece is forked so as to separate into two prongs, $b$. The side pieces are made separate from the center piece or pieces, the portion $b$ being, by a reverse bend, brought alongside of the side piece at its end, where the two are bolted together, as shown.

What I claim is—

In a platform-gear, the combination, with truss-rods, of a brace-block secured to the under side of the central frame-piece and to the end piece, said brace-block provided with depending flanges having perforations formed therein for the insertion of the ends of the truss-rods, substantially as set forth.

In testimony whereof I sign this specification in the presence of two witnesses.

CHARLES R. WILSON.

Witnesses:
WILL. M. PORTER,
S. E. THOMAS.